United States Patent [19]

Yamada

[11] 4,171,894

[45] Oct. 23, 1979

[54] RETRACTING MECHANISM FOR TAKING LENS OF CAMERA

[75] Inventor: Toyotaka Yamada, Hino, Japan

[73] Assignee: Olympus Optical Company Ltd., Tokyo, Japan

[21] Appl. No.: 969,777

[22] Filed: Dec. 15, 1978

[30] Foreign Application Priority Data

Jan. 18, 1978 [JP] Japan ............................ 53/4231[U]

[51] Int. Cl.$^2$ ........................ G03B 17/02; G03B 17/04

[52] U.S. Cl. ...................................... 354/187; 354/288

[58] Field of Search ................. 354/75, 156, 158, 187, 354/195, 219, 288, 295, 354, 189-192

[56] References Cited

U.S. PATENT DOCUMENTS

| | | | |
|---|---|---|---|
| 2,759,405 | 8/1956 | Harter | 354/191 |
| 3,103,151 | 9/1963 | Borghesani | 354/192 |
| 3,585,916 | 6/1971 | Lange | 354/187 |
| 3,750,549 | 8/1973 | Waaske | 354/354 |

*Primary Examiner*—L. T. Hix
*Assistant Examiner*—Thomas H. Tarcza
*Attorney, Agent, or Firm*—Lerner, David, Littenberg & Samuel

[57] ABSTRACT

In a camera including a taking lens which is moved in the direction of its optical axis in response to an adjustment of a distance adjusting member and also including a lens protecting cover which is movable between a first position in which it covers the front of the taking lens and a second position in which the lens is exposed, a mechanism for retracting the taking lens into the camera by rotating the distance adjusting member comprises a linkage which includes a drive member adapted to be angularly driven by the cover as the latter moves to its first position, and a connecting member which couples the drive member with the distance adjusting member.

10 Claims, 8 Drawing Figures

RETRACTING MECHANISM FOR TAKING LENS OF CAMERA

BACKGROUND OF THE INVENTION

The invention relates to a retracting mechanism for a taking lens (i.e., picture taking lens) of a camera, and more particularly, to such a mechanism for a camera having a lens protecting cover which is movable between a first position in which it covers a taking lens and a second position in which the lens is exposed.

In a camera having a slidable, lens protecting cover and in which the taking lens is axially moved along the optical axis for the purpose of focussing, the cover must be in position to close the taking lens when the camera is not in use even if the taking lens is extended forwardly as a result of focussing the camera at an object being located at a small distance. However, when so constructed, the resulting cover must be configured to extend forwardly from the camera, which is unsightly.

Since the purpose of lens protecting cover is to cover the taking lens when the camera is not used, it is desirable to provide some means which retracts the taking lens into the body of camera as the protective cover is moved. This minimizes the forward extension of the cover, thus providing a camera construction having a reduced overall thickness.

SUMMARY OF THE INVENTION

It is an object of the invention to provide a retracting mechanism for a taking lens of camera having a lens protecting cover which is constructed such that as the cover is moved to a position in which it covers the taking lens, the latter is automatically displaced toward the interior of the camera and is retracted to a position corresponding to the infinity or normal focus when the cover reaches its final position.

In accordance with the invention, as a lens protecting cover is moved to its position in which it covers a taking lens, the latter is automatically retracted into the body of a camera until a lens position corresponding to the infinity or normal focus is reached. This eliminates the need to provide a lens protecting cover of an increased size which would be required if the cover has to cover the taking lens when it is moved to a position corresponding to a short distance of an object being photographed. Hence, the forward extension of the cover as well as the overall size of camera can be minimized.

The retracting mechanism in accordance with the preferred embodiment of the present invention comprises a plate cam mounted on the inner surface of the lens protecting cover, a pin driven by the plate cam, a drive member which is angularly driven by the pin, and a connecting member which connects the drive member with a taking lens barrel. Such mechanism can be inexpensively constructed without requiring any substantial increase in the space. The plate cam may be resiliently constructed or may include position adjusting means so that a maximum stroke of retraction of the taking lens is achieved when the cover completely covers the taking lens. This assures a smooth retracting movement and also prevents undue stresses which may be produced to damage various parts as the taking lens is retracted.

DESCRIPTION OF THE PREFERRED EMBODIMENTS

Figure 1:
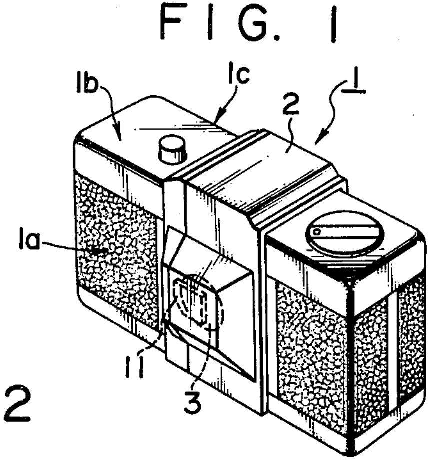
FIG. 1 is a perspective view of a camera incorporating the invention, illustrating a lens protecting cover which covers a taking lens.
Figure 2:
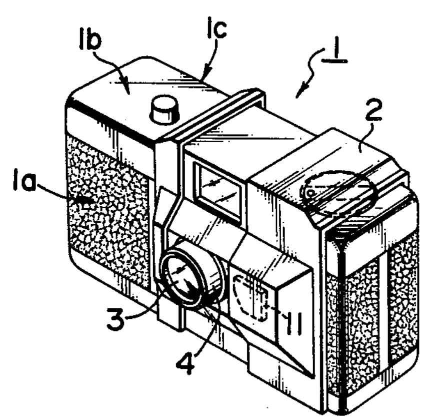
FIG. 2 is a perspective view of the camera shown in FIG. 1, illustrating the cover located to expose the taking lens.

Referring to FIGS. 1 and 2, there is shown a camera 1 having a slidable, lens protecting cover 2 and in which the invention is incorporated. The lens protecting cover 2 assumes a first position in FIG. 1 in which it covers a taking lens 3, and is shown in its second position in FIG. 2 in which the lens is exposed.

The lens protecting cover 2 is adapted to cover part of the front surface *1a*, top surface *1b* and rear surface *1c* of the camera 1 as shown, and is guided by a suitable guide member to be movable in a direction perpendicular to the optical axis of a taking lens 3 between the first position in which it covers the front of the taking lens 3 and the second position in which it exposes the latter.

Figure 3:
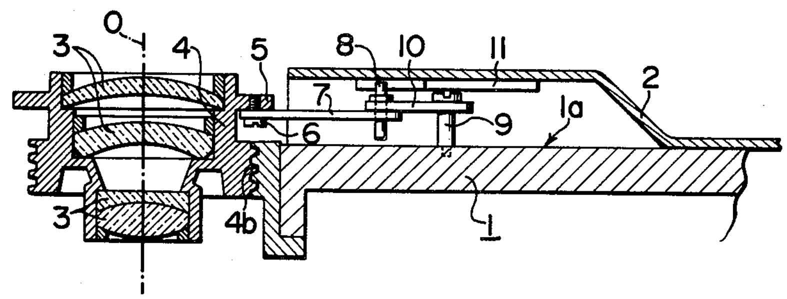
FIG. 3 is a fragmentary, enlarged cross section of the retracting mechanism according to one embodiment of the invention.

As shown in FIG. 3, taking lens 3 is supported within a lens barrel 4, and is disposed in the central region of the front of the camera 1. On its forward portion, lens barrel 4 is integrally formed with a focus adjusting member 5 in the form of a distance adjusting ring, and the rear portion of the outer periphery of the lens barrel 4 is formed with well known helicoid screw *4b*, which threadably engages with a corresponding helicoid screw integrally formed in the body of the camera, thus permitting an axial movement of the taking lens 3 as the member 5 is turned around the optical axis O.

The maximum stroke through which the taking lens 3 is moved forwardly or rearwardly as the lens barrel 4 is turned is closely controlled during the design of a camera, by the abutment of either one end or the other of a notch *4a* (see FIG. 4) which is peripherally formed in the distance adjusting member 5 integral with the lens barrel 4, against a stop pin 12 which is fixedly mounted on the front surface *1a* of the camera. Specifically, as the member 5 is turned clockwise about the axis O, as viewed in FIG. 4, to retract the lens barrel 4, and hence the taking lens 3, in the direction of the optical axis, the movement of the lens barrel 4 is eventually interrupted by the abutment of the lower inner end of the notch *4a* against the stop pin 12. In this position, the taking lens 3 is focussed to infinity or normal focal length which may be 3 meters, for example, and is maintained at rest thereat. Conversely, when the member 5 is turned counter-clockwise to move the lens barrel 4 and hence the taking lens 3 forwardly, the movement is eventually interrupted by the abutment of the upper inner edge of the notch *4a* against the stop pin 12. At this time, the taking lens is focussed to a short distance and is maintained at rest thereat.

Figure 4:
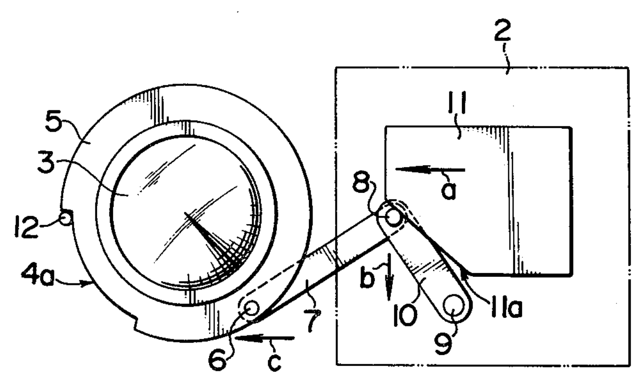
FIG. 4 is a fragmentary front view of the mechanism shown in FIG. 3, with the cover being removed and only showing the plate cam.

The taking lens retracting mechanism of the invention is mounted on the camera 1 in a manner to be described below. Referring to FIG. 3, member 5 fixedly carries a pin 6 on its rear surface, and a link or connecting member 7 has its one end pivotally connected with the pin 6. The other end of the connecting member 7 is loosely fitted over a drive pin 8 which is adapted to be driven by a plate cam 11 to be described later. A stud 9 is fixedly mounted on the front surface 1*a* at a position to the right of the taking lens 3, and a drive member 10 has its one end pivotally mounted on the stud 9, the other end of the drive member 10 fixedly carrying the pin 8. The drive member 10 is in the form of a link which is adapted to be angularly driven counter-clockwise, as viewed in FIG. 4, about stud 9 as the pin 8 moves. Referring to FIG. 4, it will be seen that the connecting member 7 and the drive member 10 are connected together through the pin 8, thus forming a linkage comprising links which are adapted to angularly move in opposite directions. The plate cam 11 is fixedly mounted on the inner surface of the lens protecting cover 2 in a region thereof which covers the taking lens 3, and is formed with a bevelled cam profile 11*a* which is located opposite to the pin 8.

In operation, when the protecting cover 2 is moved in the direction of an arrow a from its second position in which the taking lens 3 is exposed to its first position in which the lens is covered, the plate cam 11 also moves in the same direction, with its cam profile 11*a* urging the pin 8 to move in a direction indicated by an arrow b, whereby drive member 10 angularly moves in the counter-clockwise direction. This angular movement of the drive member 10 is transmitted to the connecting member 7, which then moves in the direction indicated by an arrow c. Consequently, the distance adjusting member 5 which is connected with the connecting member 7 through the pin 6 rotates clockwise, as viewed in FIG. 4, about the optical axis. The lens barrel 4 also rotates clockwise, whereby the taking lens 3 is retracted into the camera 1 by the action of the helicoid screw 4*b* until a position is reached where the lens is focussed to infinity. In this manner, as the protecting cover 2 is moved to a position where it covers the taking lens 3, the latter is automatically retracted to an infinity position, thus allowing the cover 2 to enclose the taking lens in a satisfactory manner. It should be understood that in the described embodiment, the entire taking lens is moved axially, but that the invention can be equally applied to a camera having a taking lens of the type in which only the front lens portion is moved forwardly.

Figure 5:
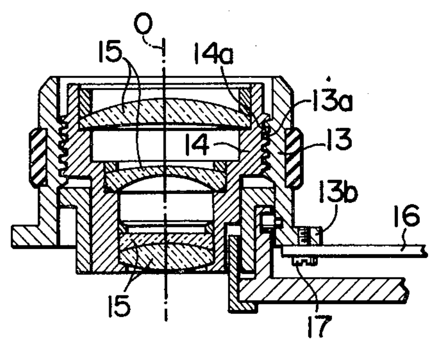
FIG. 5 is a fragmentary cross section of the retracting mechanism according to another embodiment of the invention.

FIG. 5 shows another embodiment of the invention which is used for a camera of the type having a distance adjusting member which is separate from a lens barrel. Referring to FIG. 5, there is shown a lens barrel 14 which carries a taking lens 15. A distance adjusting member 13 in the form of a sleeve is fitted around the lens barrel 14 so as to be rotatable through a given angle. The member 13 is internally formed with a helicoid screw 13*a* which threadably engages with a corresponding helicoid screw 14*a* formed on the outer surface of the barrel 14. A connecting member 16, which corresponds to the connecting member 7 of the embodiment shown in FIGS. 3 and 4, has its one end fitted on a pin 17 which is fixedly carried by a flange 13*b* formed at the bottom end of the member 13. In other respects, the arrangement may be similar to that shown in the previous embodiment.

Figure 6:
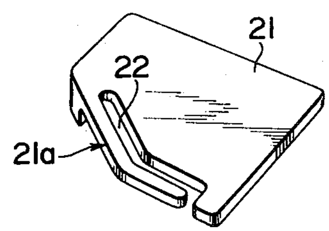
FIGS. 6 to 8 are perspective views showing other forms of the plate cam.
Figure 7:
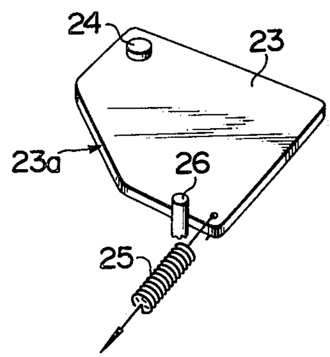
Figure 8:
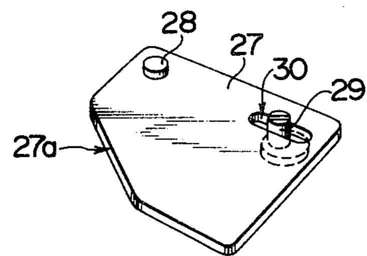

FIGS. 6 to 8 show other forms of the plate cam which is mounted on the inner surface of the lens protecting cover 2. As mentioned previously, the first and second positions of the taking lens where it is focussed to a small distance and to infinity can be closely controlled as by a combination of the notch 4*a* and stop pin 12 illustrated in FIG. 4, for example. However, with the mechanism of the invention which moves the taking lens through the distance adjusting member, drive member, connecting member, drive pin and plate cam interposed therebetween, it is almost impossible to achieve a close coincidence between the position assumed by the taking lens 3 when the lens protecting cover 2 is moved to its first position and the position assumed by the taking lens when one edge of the notch 4*a* bears against the stop pin 12. This may cause undue stresses to be applied to the connecting member 7, causing a damage of certain parts or preventing a smooth operation.

To avoid these difficulties, the plate cams shown in FIGS. 6 to 8 include certain sophistications. Specifically, FIG. 6 shows a plate cam 21 which is formed with a bevelled cam profile 21*a* and a notched slot 22 generally extending parallel to the profile 21*a*. As the cam profile 21*a* drives the pin 8 (see FIGS. 3 and 4), the cam absorbs the reaction resiliently, thus preventing undue stresses from being applied to the pin 8.

FIG. 7 shows another form of plate cam 23 which is formed with a mounting hole in the left-hand upper corner thereof which is rotatably mounted on a stationary stud 24 secured to the inner surface of the lens protecting cover 2. The diametrically opposite corner of the plate cam is engaged by a coiled tension spring 25, which urges the cam to rotate clockwise until its adjacent edge bears against a stop pin 26 fixedly mounted on the inner surface of the cover. However, when undue stresses are applied to its cam profile 23*a*, the plate cam 23 is capable of rotating counter-clockwise against the resilience of spring 25, thus providing a resilient reaction.

FIG. 8 shows a further form of plate cam 27 which can be adjustably secured so that the angular orientation of its bevelled cam profile 27*a* may be adjusted. Specifically, the plate cam 27 has an opening in its left-hand, upper corner which is fitted on a stationary stud 28, and is also formed with an elongated slot 30 in its right-hand upper corner which engages an eccentric pin 29 mounted on the inner surface of the cover 2. By adjusting the eccentric pin 29 in a suitable manner, the angular orientation of the cam profile 27 may be adjusted. An optimum position of the plate 27 can be chosen by temporarily mounting it in a selected orientation and operating it to drive the pin 8.

In the embodiment described in connection with FIGS. 3 and 4, it should be understood that the pin 8 may be fixedly mounted on the free end of the drive member 10.

What is claimed is:

1. A camera comprising:

a camera body;

a lens having an optical axis mounted in said camera body for movement along said optical axis between an extended position and a retracted position;

an adjusting member for said lens, said adjusting member being rotatable about said optical axis to adjust the axial position of said lens along said optical axis;

a lens cover member slidably mounted on said camera body to move between a first position in which said lens cover member covers the front of said lens and a second position in which said lens is exposed; and retracting means responsive to the movement of said lens cover member from said second position to said first position to cause rotation of said adjusting member to move said lens to said retracted position.

2. The camera of claim 1 wherein said retracting means comprises a drive member pivotally mounted on said camera for angular movement about a pivot in response to movement of said cover member from said second position to said first position and a connecting member connected to said drive member and to said adjusting member for causing rotation of said adjusting member to move said lens to said retractive position in response to the angular movement of said drive member.

3. The camera of claim 2 wherein said drive member includes a drive pin spaced from said pivot and wherein said retracting means further includes a camming plate on said cover member for camming said pin to angularly drive said drive member when said cover member moves from said second position to said first position.

4. The camera of claim 3 wherein said cover member is slidably movable in a direction perpendicular to said optical axis of said lens; and wherein said camming plate has a bevelled cam profile inclined with respect to the direction of movement of said cover member for cooperatively camming said pin member.

5. The camera of claim 4 further including adjusting means for adjusting the orientation of said bevelled cam profile.

6. The camera of claim 5 wherein said adjusting means comprises a slot formed in said camming plate adjacent the portion of said camming plate defining said bevelled cam profile for permitting said portion of said camming plate to be resiliently movable when said camming plate engages said drive pin.

7. The camera of claim 5 wherein said adjusting means comprises means rotatably mounting said camming plate to said cover member and biasing means for urging said cover member to assume a predetermined position.

8. The camera of claim 5 wherein said adjusting means comprises means rotatably mounting said camming plate to said cover member, a slot in said camming plate and a rotatable, eccentrically mounted pin fitted into said slot for adjusting the angular orientation of said camming plate.

9. The camera of claim 3 wherein said connecting member comprises a link having a first end rotatably mounted on said adjusting member and a second end rotatably connected to said drive pin to form a linkage with said drive member.

10. The camera of claim 1 wherein said retracted position of said lens corresponds with the position of said lens when said lens is focused to infinity.

* * * * *